United States Patent [19]

Kawasaki

[11] Patent Number: 4,541,501
[45] Date of Patent: Sep. 17, 1985

[54] ARTICULATED TRICYCLE

[75] Inventor: Katsuyoshi Kawasaki, Tokyo, Japan

[73] Assignee: Honda Giken Kogyo Kabushiki Kaisha, Tokyo, Japan

[21] Appl. No.: 615,691

[22] Filed: May 29, 1984

Related U.S. Application Data

[63] Continuation of Ser. No. 472,716, Mar. 7, 1983, abandoned.

[30] Foreign Application Priority Data

Mar. 17, 1982 [JP] Japan ................................. 57-42276
Mar. 25, 1982 [JP] Japan ................................. 57-47742

[51] Int. Cl.⁴ ......................... B62D 61/08; B62K 5/04
[52] U.S. Cl. ................................. 180/215; 180/217; 280/112 A; 280/282
[58] Field of Search ............... 180/215, 210, 213, 217; 280/62, 111, 112 R, 112 A, 220, 282; 464/145, 906

[56] References Cited

U.S. PATENT DOCUMENTS

| | | | |
|---|---|---|---|
| 3,029,889 | 4/1962 | Paramythioti | 280/111 X |
| 3,504,934 | 4/1970 | Wallis | 280/112 R X |
| 3,583,727 | 6/1971 | Wallis | 280/112 A X |
| 4,003,443 | 1/1977 | Boughers | 280/112 A X |
| 4,159,752 | 7/1979 | Kanno | 280/111 X |
| 4,325,449 | 4/1982 | D'Addio et al. | 180/215 X |
| 4,356,876 | 11/1982 | Watanabe et al. | 180/210 |
| 4,372,417 | 2/1983 | Yamamoto et al. | 180/215 |
| 4,437,535 | 3/1984 | Winchell et al. | 180/215 |
| 4,469,188 | 9/1984 | Mita | 180/215 |

FOREIGN PATENT DOCUMENTS

| | | | |
|---|---|---|---|
| WO79/686 | 9/1979 | PCT Int'l Appl. | 280/112 R |
| 2014094 | 8/1979 | United Kingdom . | |
| 2082987 | 3/1982 | United Kingdom . | |
| 2087324 | 5/1982 | United Kingdom | 280/282 |

Primary Examiner—Joseph F. Peters, Jr.
Assistant Examiner—Mitchell J. Hill
Attorney, Agent, or Firm—Lyon & Lyon

[57] ABSTRACT

An articulated tricycle of the swingable type employing a front body and a rear body, the front body having a front wheel and a rear body having two rear wheels mounted on an axle or axles. The rear body includes a first body member and a second body member. The first body member is pivoted about a longitudinal axis to the front body while the second body member is pivotally mounted about a transverse axis to the first body member. The second body member includes mounting for the rear wheels. The second body member may be divided into two links to provide independent rear suspension for the wheels. A gear train extends between an engine, located in the first body member, and the rear axle or axles. This gear train is shown to include a chain or belt drive and may include two such chains or belts when the second body member employs two links. Either the rear axle, or, in the case of the multiple link second body member, the transverse drive shaft may include a differential mechanism for providing some relative pivotal movement of one rear wheel relative to the other.

11 Claims, 9 Drawing Figures

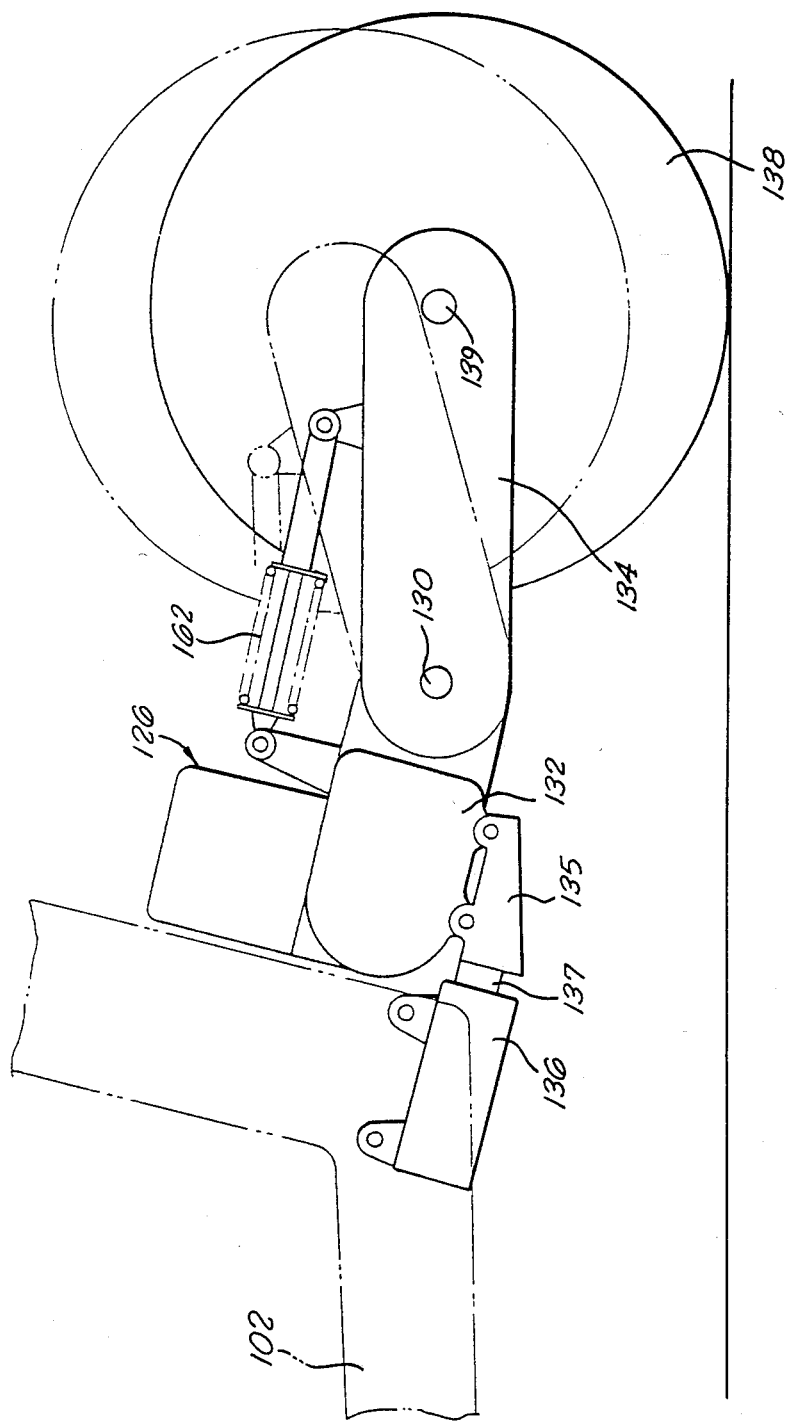

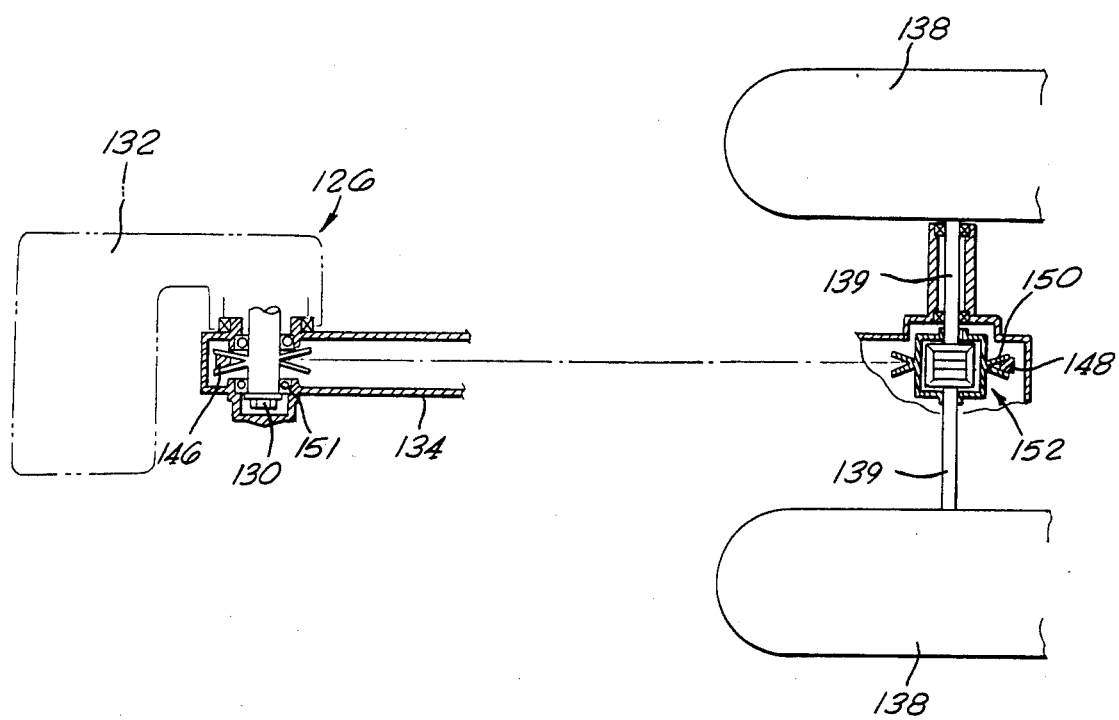
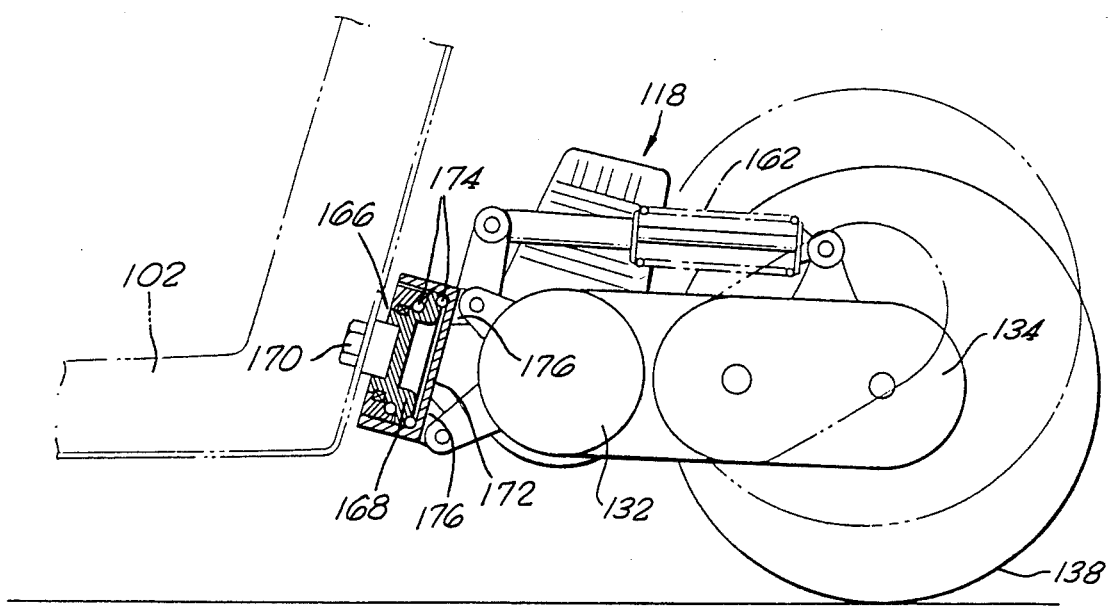

ARTICULATED TRICYCLE

This application is a continuation of application Ser. No. 472,716, filed 3/7/83, abandoned.

BACKGROUND OF THE INVENTION

The field of the present invention is articulated tricycles and the structure and drive thereof.

Articulated or swingable tricycles have been developed such as illustrated in FIG. 9. In such tricycles, a front body 10 includes a front wheel 12 which is steerable by means of the conventional handlebars 14, a seat 16 and the requisite frame structure to support same. A rear body 18 includes two rear wheels 20, an engine 22 and a power train 24. The engine 22 is coupled to an axle of the rear wheel 20 through the power train 24 by a conventional chain and sprocket mechanism. The tricycle is articulated between the front body 10 and the rear body 18 such that the rear body 18 may swing in a vertical plane about a transverse axis 25 through bracket 26; and a front body 10 may roll relative to the rear body 18 and relative to the ground about a longitudinal axis through a rolling joint 28. The rolling joint includes a joint case 30 pivotally mounted to the bracket 26 and a shaft 32 extending into the joint case 30. The shaft 32 is fixed to the rear body 18. Thus, relative motion between the front body 10 and the rear body 18 may occur about the transverse axis of the bracket 26 and the longitudinal axis of the rolling joint 28. A cushion member 34 acts as a suspension mechanism between the front body 10 and the rear body 18.

The operation of such articulated tricycles is to have the front body lean or roll into a turn while the rear body remains upright with both wheels 20 remaining on the ground. The tricycle is suspended using a conventional front wheel cushion and the cushion member 34. Thus, the entire rear body 18, including the engine 22, the power train 24, and the rear wheels 20, acts as unsprung weight. Because of the nature of this arrangement, a substantial percentage of the mass of the tricycle is unsprung. Additionally, the length of the rear body 18 is generally determined by the space required for the engine 22, the power train 24 and the wheels 20. The effective length creates a substantial moment arm. Thus, the unsprung mass for such articulated tricycles has a relatively high inertia and moment of inertia. This detracts from the ride of the vehicle and makes the design of an optimum cushioning system difficult.

Another articulated or swingable tricycle having a reduced unsprung mass by having an engine mounted on the front body of the vehicle is illustrated in copending U.S. Patent Application to Mita, entitled Articulated Tricycle Ser. No. 472,083 filed Mar. 4, 1983. The Mita application is incorporated herein by reference.

SUMMARY OF THE INVENTION

The present invention is directed to an articulated tricycle of the swingable type having a front body and a rear body, the front body being allowed to roll about a longitudinal axis relative to the rear wheels. The rear body is divided into two body members, the first of which has an engine mounted thereon and the second of which provides mounting for the rear wheels. The first body member of the rear body is mounted to the front body about a longitudinal axis and the second body member is mounted to the first body member about a transverse axis. A power train extends between the engine mounted in the first body member and the rear wheels mounted to the second body member of the rear body. The second body member may be divided to provide individual suspensions and individual drive trains to each of the rear wheels.

The foregoing configuration moves the engine into the sprung portion of the vehicle. This allows the unsprung portion to be both lighter in weight and shorter in length. Further, the engine remains in the portion of the vehicle which does not roll with the front body during cornering. Thus, unsprung inertia and moment of inertia are reduced as are the effects of having the engine mounted in the rolling portion of the vehicle. The cushioning system may then be better employed to provide adequate suspension and a reasonable ride. In this way, the present configuration avoids the difficulties associated with prior articulated tricycles having the engine mounted in the unsprung portion of the body.

Accordingly, it is an object of the present invention to provide an improved articulated tricycle of the swingable type. Other and further objects and advantages will appear hereinafter.

BRIEF DESCRIPTION OF THE DRAWINGS

FIG. 2 is a side elevation illustrating the construction of the rear portion of the tricycle.

FIG. 3 is a schematic plan view of the drive system of the present invention.

FIG. 5 is a side elevation illustrating the construction of yet another embodiment of the rear portion of the tricycle.

DETAILED DESCRIPTION OF THE PREFERRED EMBODIMENTS

Figure 1:
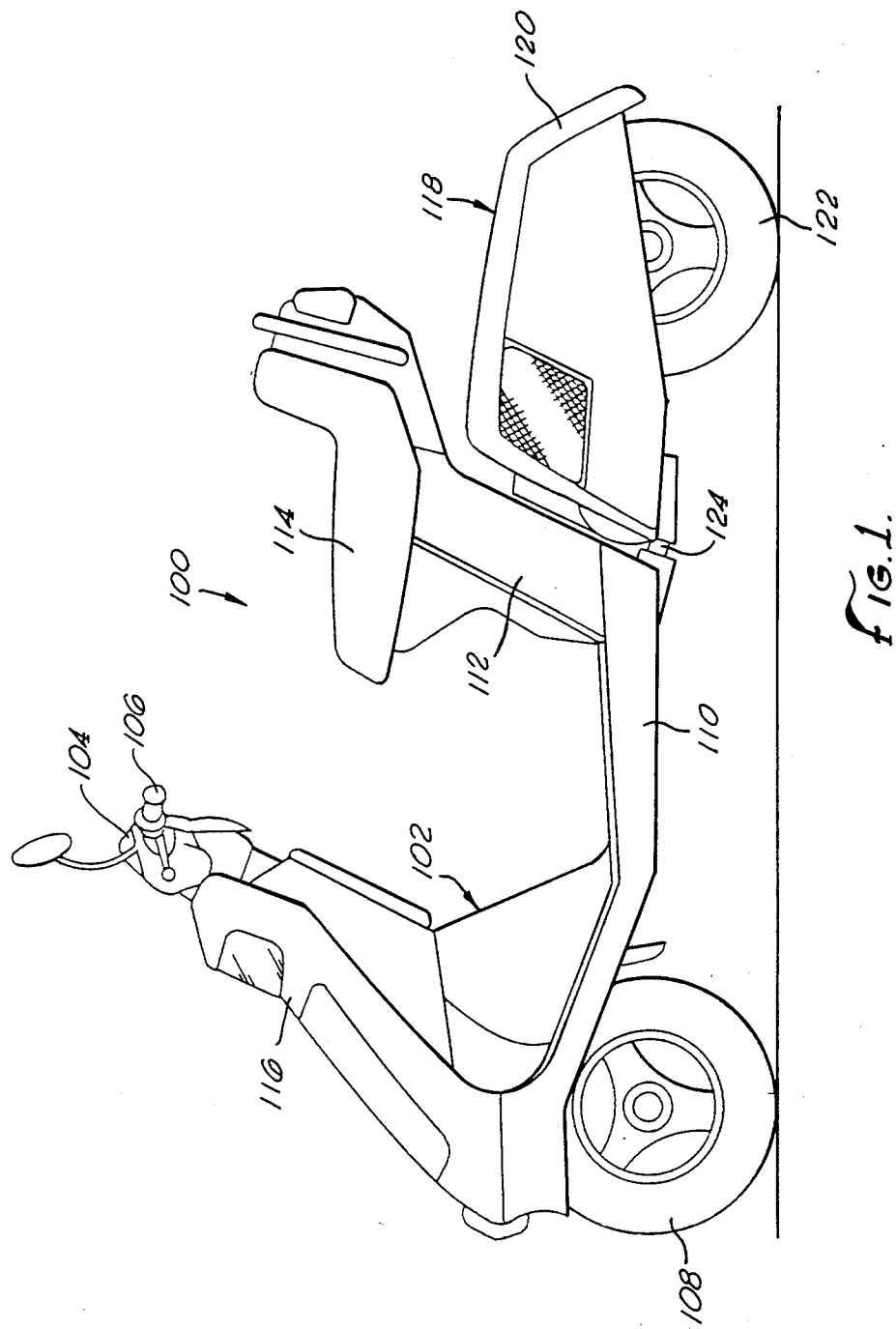
FIG. 1 is a side elevation of an articulated tricycle of the present invention.

Turning in detail to the drawings and particularly the first embodiment illustrated in FIGS. 1, 2 and 3, an articulated tricycle 100 of the swingable type is illustrated. The tricycle 100 includes a front body 102 to which is pivotally mounted a steerable front wheel mechanism 104 including handlebars 106 and a front wheel 108. As the articulated tricycle may find uses for other than wheeled vehicles, other means for supporting both the front and the rear of the tricycle other than wheels are contemplated by this invention. Included as part of the front body 102 is a floor section 110, a seat post 112 supporting a seat 114 and a front panel 116.

The articulated tricycle 100 also includes a rear body 118. The rear body 118 includes a housing or shell 120 and is supported stably on the ground by support means, in the present embodiment two rear wheels 122. The front body 102 and the rear body 118 are joined by means of an articular mechanism spanning the two body sections at 124.

Looking then more specifically at FIGS. 2 and 3, just aft of the seat post 112 and located low on the vehicle is an engine 126. The engine is designed for motive power for the tricycle and may be selected from a wide range of mechanisms particularly adapted to small vehicles and the like. The engine is connected by means of gearing, chain or belt mechanisms to a transverse drive shaft which is considered to be the output of the engine. Thus, the output of the engine is arranged to rotate about a transverse axis.

The rear body 118 includes a first body member 132 and a second body member 134. The engine 126 is mounted to the first body member 132. This first body member 132 is coupled to the front body 102 by a joint extending substantially along the longitudinal axis of the vehicle. This joint may be provided through a Neidhart mechanism with a shaft 137 extending forwardly from a bracket 135 fixed to the first body member into a case 136 fixed to the front body. Thus, the front body 102 may roll when cornering relative to the first body member 132 holding the engine 126.

The second body member 134 is pivotally mounted about a transverse axis coincident with a transverse shaft 130. Thus, the second body member 134 is able to move in a vertical plane about the shaft 130. The second body member 134 extends rearwardly from the shaft 130 to surround a rear axle 139. The rear axle 139 extends transversely of the vehicle to the rear wheels 138.

With the joint between the front body 102 and the first body member 132 of the rear body 118 allowing pivotal movement about a longitudinal axis and with the joint between the first body member 132 and the second body member 134 allowing pivotal motion therebetween about a transverse axis, the second body member 132 acts by itself as an unsprung mass to rotate about the transverse axis at the shaft 130. At the same time, both the first body member 132 and the second body member 134 operate together from the standpoint of vehicle roll. The entire rear body 118 remains resistant to roll with the presence of two spaced rear wheels. Thus, the front body 102 and the rear body 118 as a whole experience relative pivotal movement in a rolling motion. The engine is not considered a portion of the unsprung weight and also is not a part of the rolling segment of the body. The unsprung weight is pivotally attached at the shaft 130 to the first body member 132 and the swingable portion of the vehicle is attached through the longitudinal joint to the first body member 132 forward of that body member. The rear wheels are thus fixed in a trailing link type suspension mechanism and the front body 102 may independently roll into turns while both rear wheels remain on the ground and the engine remains both sprung and nonrolling.

Located interior to the second body member 134 is a drive train coupling the engine 126 and the rear axle 137, and in turn the rear wheels 138. The drive train is shown to be of a continuous flexible loop drive having a flexible loop, a drive wheel and a driven wheel. In the preferred embodiment, a drive pulley 146, a flexible belt 148 and a driven pulley 150 are employed. A chain and pulleys may also be employed depending upon the power requirements of the system. The drive pulley 146 is mounted to the shaft 130 driven by the engine 126. Bearings 151 in turn mount the shaft 130 to the second body member 134 which is in turn mounted to the first body member 132 as can best be seen in FIG. 3.

Located about the rear axle 137 is the driven pulley 150. The driven pulley 150 cooperates with the drive pulley 146 and intermediate belt 148 to power the rear wheels. To couple the driven pulley 150 with the rear axle 137, the pulley 150 is fixed to the exterior of a differential mechanism allowing some rotation of the wheels 138 relative to one another. The differential mechanism 152 may be of the differential gear type as illustrated in FIG. 3 or may be of the multiple disc friction clutch type. In either event, the pulley 150 is fixed to the differential mechanism in this embodiment. The rear axle 137 is thus found to be in two sections on either side of the differential mechanism 152 for transmission of power to the rear wheels 138. With the rear body 118 and particularly the second body member 134 mounted in a manner that it may pivot about the transverse axis at shaft 130, a cushion member 162 extends between the first body member 132 and the second body member 134 to provide resilient and damped restraint of the second body member 134 relative to the remaining portions of the vehicle. As can be seen in FIG. 2, a minimum amount of unsprung weight and body length are exhibited in association with the second body member 134 in accordance with this embodiment.

Figure 4:
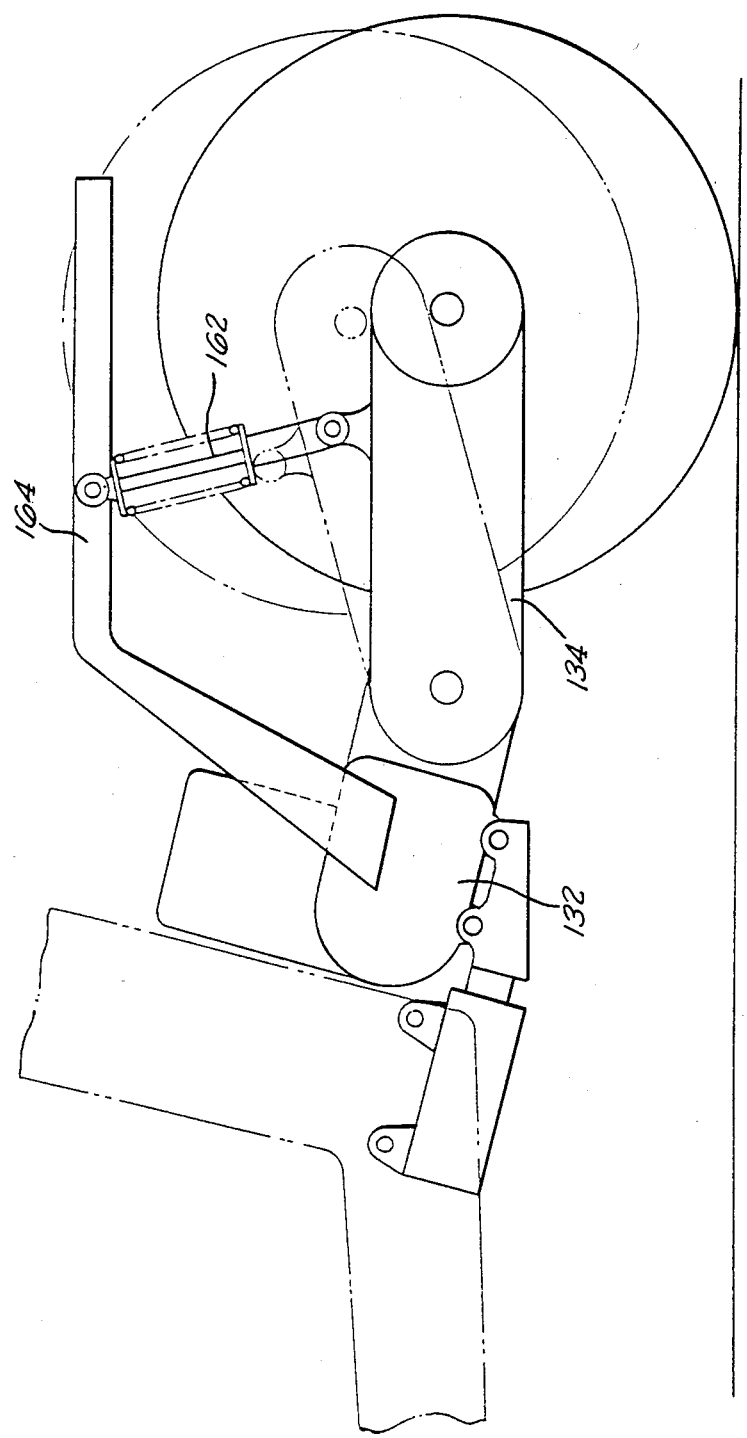
FIG. 4 is side elevation illustrating the construction of a second embodiment of the rear portion of the tricycle.

Looking then to a second embodiment, as illustrated in FIG. 4, a structural element 164 extends rearwardly to a position above the second body member 134. This structural element 164 is fixed to the first body member 132 such that it moves therewith. Consequently, the cushion member 162 may be mounted to the structural element 164 of the second body member 134 as illustrated in FIG. 4. The structural element 164 may additionally operate as a structural support for a luggage rack, other equipment or body parts.

Figure 6:
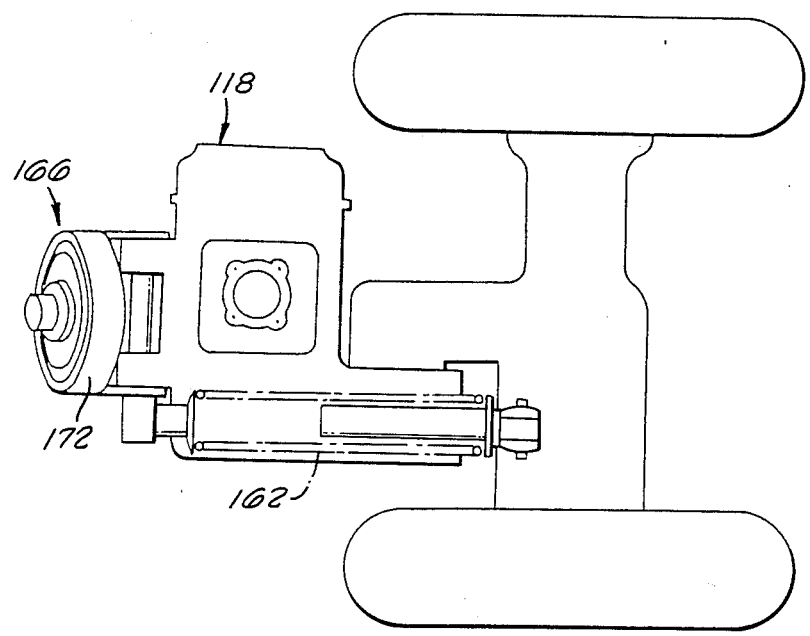
FIG. 6 is a plan view of the device illustrated in FIG. 5.
Figure 7:
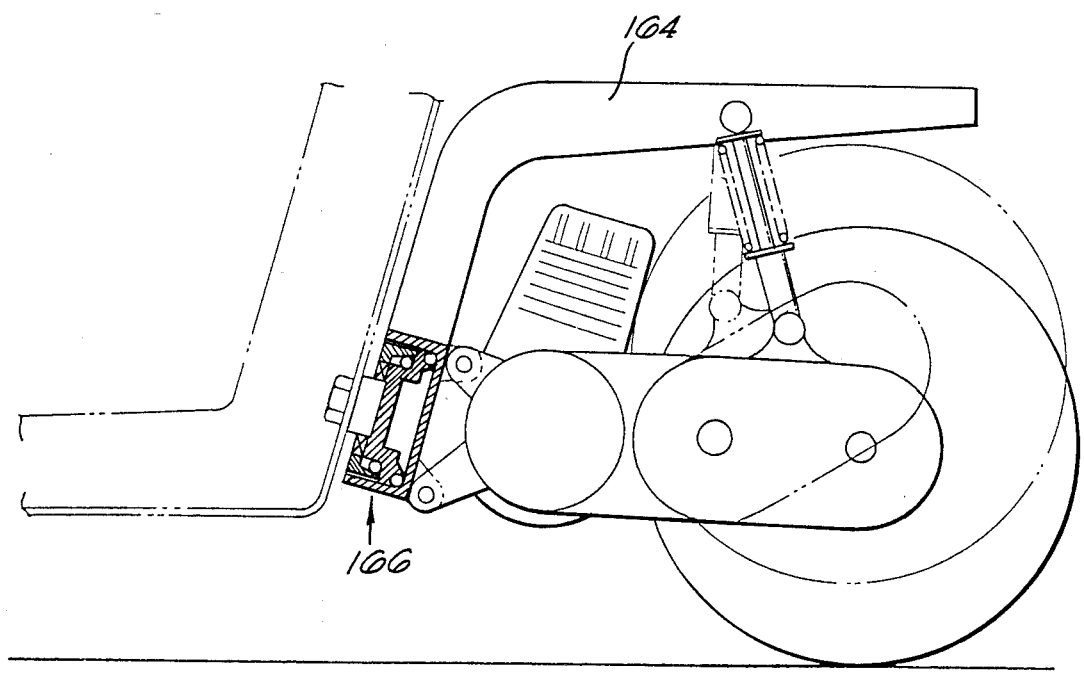
FIG. 7 is side elevation illustrating the construction of yet another embodiment of the rear portion of the tricycle.

Looking then to the embodiments of FIGS. 5, 6 and 7, the same general elements are illustrated and identical numbers are employed. The embodiment of FIG. 7 differs from that of FIGS. 5 and 6 solely by virtue of the structural element 164. The Figures further differ from the prior embodiments by the nature of the joint forming the longitudinal axis for relative rotation between the front body 102 and the rear body 118. A roll joint 166 is illustrated which is composed of a disc plate 168 secured with a nut 170 to the front body 102. This disc plate 168 may be secured from rotating relative to the front body 102 by means of a conventional pin (not shown). A casing 172 rotatably installed with bearings 174 on the periphery of the disc plate 168 is in turn attached to the first body member 132 through brackets 176. Thus, the front body 102 is able to rotate about the roll joint 166 relative to the first body member 132.

Figure 8:
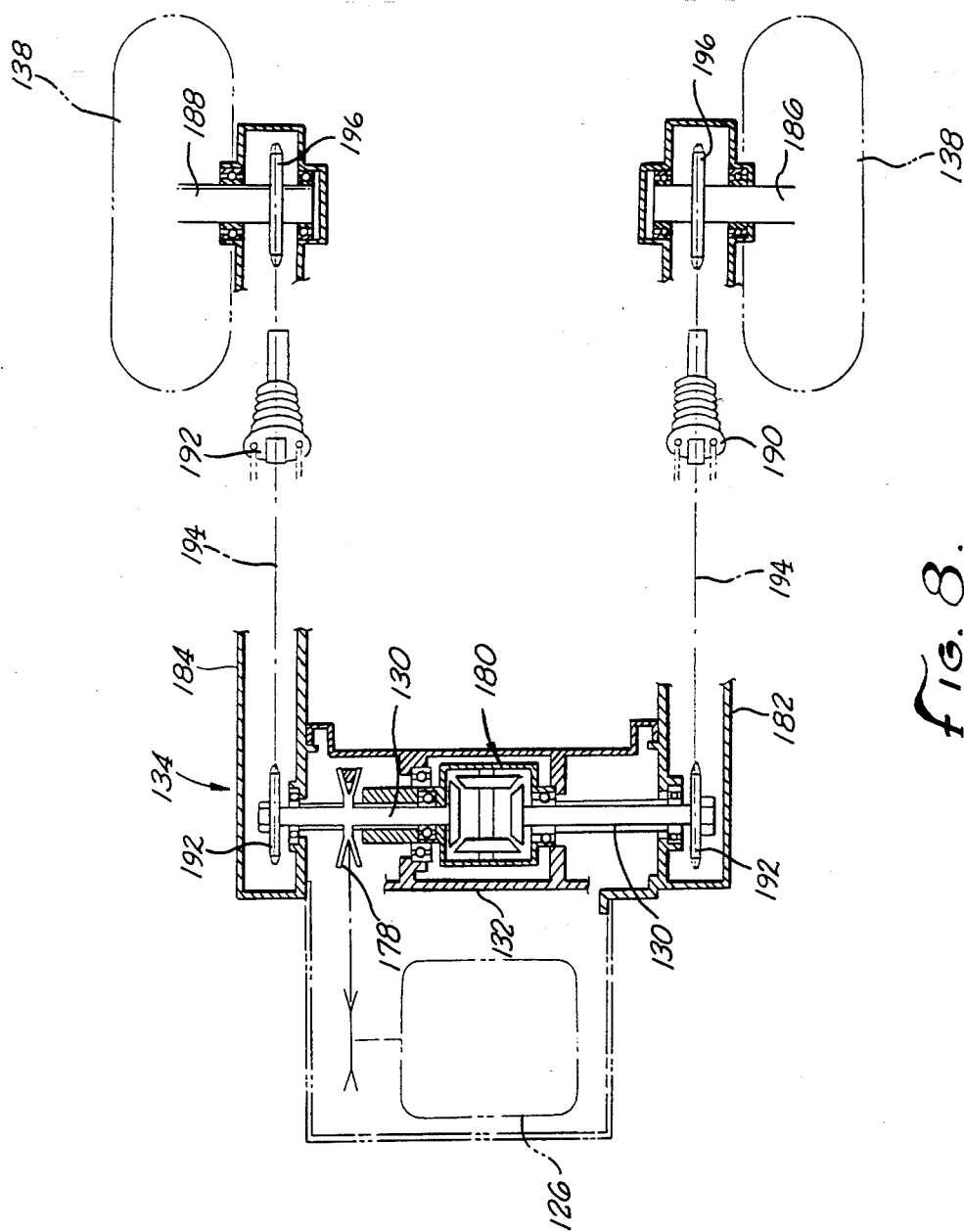
FIG. 8 is a plan view of another embodiment of the present invention illustrated in schematic.
Figure 9:
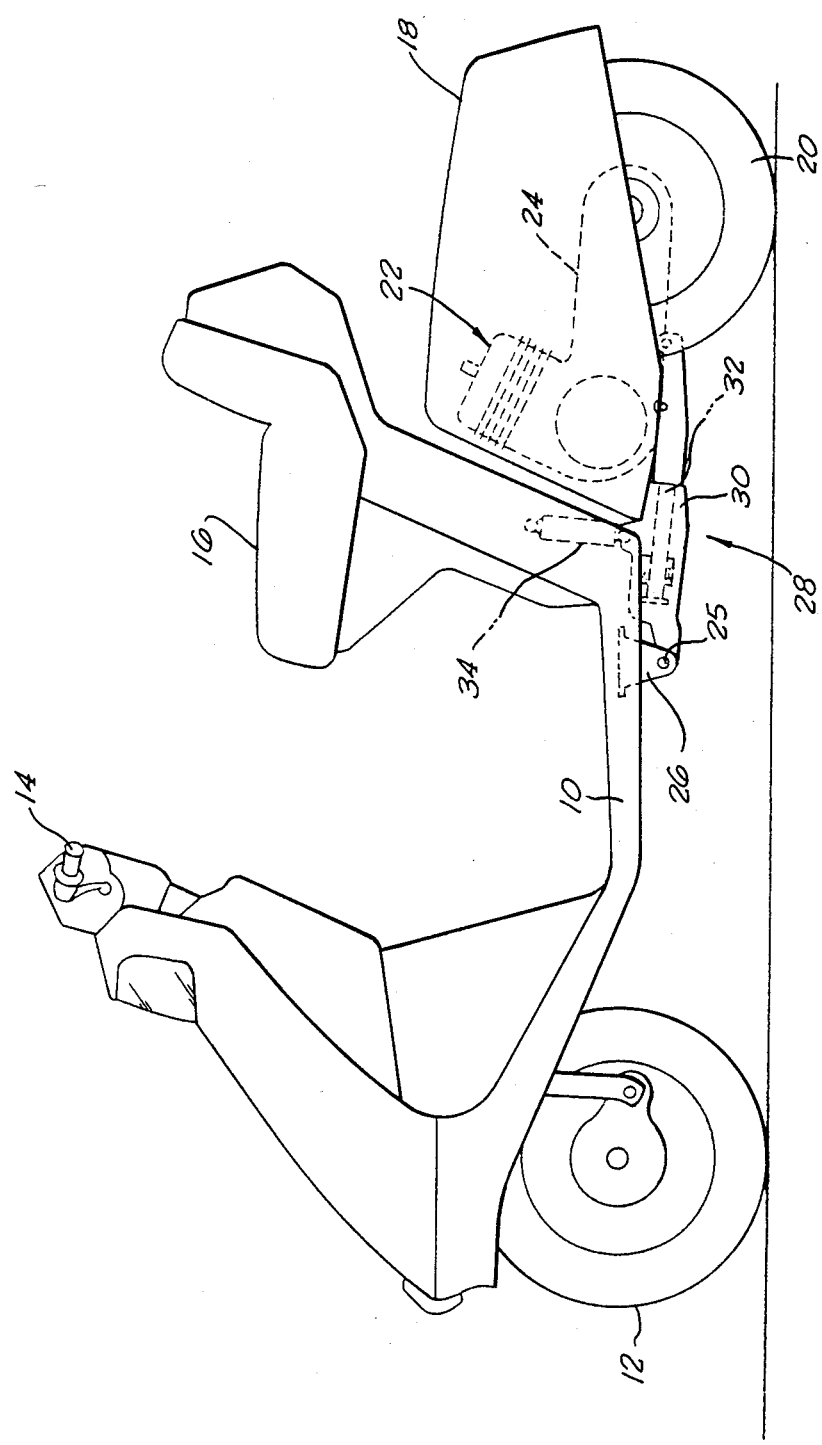
FIG. 9 is a side elevation of an articulated tricycle of the prior art.

Turning then to the embodiment of FIG. 8, an engine 126 is disclosed as providing the same function as in prior embodiments. However, an extended drive shaft 130 extends transversely of the vehicle. The engine 126 is coupled to this drive shaft by means of a pulley 178. The drive shaft 130 includes a differential mechanism 180 to allow at least some relative rotation between the rear wheels 138. The drive shaft 130 is rotatably mounted to the first body member 132 by means of conventional bearings. The differential mechanism 180 is also so mounted.

Located at the outboard ends of the shaft 130 are independently pivotally mounted left and right body links 182 and 184 forming the second body member 134. The body links 182 and 184 are pivotally mounted to the first body member 132 about the transverse axis extending through the shaft 130. These links 182 and 184 then extend rearwardly to independent axles 186 and 188 associated with each of the rear wheels 138. Thus, each rear wheel 138 may pivot about the transverse axis independently of the other rear wheel 138. To control the pivotal motion of the links 182 and 184, both resiliently and with damping, two cushion members 190 and 192 extend between the links 182 and 184 and the first body member 132.

Independent drive trains extends from the transverse drive shaft 130 to drive the rear wheels 138. Each drive train is a continuous flexible loop drive having a flexible loop, a drive wheel and a driven wheel. In the embodiment of FIG. 8, a drive sprocket 192, a chain 194 and a driven sprocket 196 are employed for each independent drive train. A V-belt or tooth belt and pulleys may also be employed depending upon the power requirements of the system. Each of the drive trains is positioned within one of the body links 182 and 184 to transmit power from the shaft 130 to the axles 186 and 188. The independent operation of the links 182 and 184 thus gives the advantageous operation of an independent suspension system.

Thus, several embodiments of the present invention defining improved articulated tricycles of the swingable type have been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A tricycle comprising
 a front body;
 a rear body including a first body member pivotally mounted to said front body about a longitudinal axis and a second body member pivotally mounted to said first body member about a transverse axis;
 an engine mounted to said first body member; and
 a power train mounted to said second body member, said engine and said power train being coupled about said transverse axis so as to allow power transmission therebetween.

2. The tricycle of claim 1 for use on a surface wherein said front body includes a front support means for supporting said front body on the surface and said rear body includes rear support means for supporting said rear body on the surface, said rear support means retaining said second body member from rolling about said longitudinal relative to the surface, said front support means allowing rolling of said front body about said longitudinal axis relative to the support surface.

3. The tricycle of claim 1 further including a cushion member extending between said first body member and said second body member.

4. The tricycle of claim 3 wherein said first body member includes a structural element extending longitudinally to above said second body member, said structural element being fixed relative to said first body member and said cushion member extending between said structural element and said second body member.

5. A tricycle comprising
 a front body including a front wheel;
 a rear body including two rear wheels, a first body member and a second body member, said first body member being pivotally mounted to said front body about a longitudinal axis and said second body member being pivotally mounted to said first body member about a transverse axis and supporting said rear wheels;
 an engine mounted to said first body member; and
 a power train mounted to said second body member, said engine and said power train being coupled so as to allow power transmission therebetween and said power train being coupled to said rear wheels.

6. The tricycle of claim 5 wherein said power train includes a drive wheel rotatably mounted about said transverse axis and being driven by said engine, an axle extending between said two rear wheels, a driven wheel fixed to rotate with said axle and a flexible loop extending between said drive wheel and said driven wheel.

7. The tricycle of claim 6 wherein said axle includes a differential, said driven wheel being positioned about said differential and constructed and arranged to drive said differential.

8. The tricycle of claim 5 wherein said second body member is divided into a left body link and a right body link, said body link being independently pivotally mounted about said transverse axis, said left body link extending to a first of said two rear wheels and said right body link extending to a second of said two rear wheels.

9. The tricycle of claim 8 further including two cushion members, a first of said two cushion members extending between said first body member and said left body link and the second of said two cushion members extending between said first body member and said right body link.

10. The tricycle of claim 8 wherein said power train includes a transverse drive shaft driven by said engine and extending on said transverse axis, a left continuous flexible loop drive driving one of said rear wheels and a right continuous flexible loop drive driving the other of said rear wheels.

11. The tricycle of claim 10 wherein said transverse drive shaft includes a differential therein between said first continuous flexible loop drive and said second continuous flexible loop drive.

* * * * *

UNITED STATES PATENT AND TRADEMARK OFFICE
CERTIFICATE OF CORRECTION

PATENT NO. : 4,541,501
DATED : September 17, 1985
INVENTOR(S) : KATSUYOSHI KAWASAKI It is certified that error appears in the above—identified patent and that said Letters Patent is hereby corrected as shown below:

In column 5, line 49, after "longitudinal", insert -- axis --.

Signed and Sealed this

Seventeenth Day of December 1985

[SEAL]

Attest:

DONALD J. QUIGG

*Attesting Officer*   *Commissioner of Patents and Trademarks*